United States Patent [19]

Kracklauer

[11] 3,756,411
[45] Sept. 4, 1973

[54] CONTINUOUS BELT-TYPE GRAVITY FILTRATION APPARATUS

[75] Inventor: Aloysius C. Kracklauer, Conroe, Tex.

[73] Assignee: Sparkler Manufacturing Company, Conroe, Tex.

[22] Filed: July 14, 1971

[21] Appl. No.: 162,604

[52] U.S. Cl.................. 210/179, 210/393, 210/401
[51] Int. Cl........................ B01d 35/18, B01d 33/04
[58] Field of Search..................... 210/68, 179, 393, 210/400, 401

[56] References Cited
UNITED STATES PATENTS

| | | | |
|---|---|---|---|
| 3,440,949 | 4/1969 | Trussell | 210/400 X |
| 1,876,123 | 9/1932 | Wright | 210/401 X |
| 3,437,210 | 4/1969 | O'Neill | 210/393 X |
| 3,375,932 | 4/1968 | Ishigaki | 210/401 X |
| 3,254,768 | 6/1966 | Shimizu | 210/401 X |
| 2,876,904 | 3/1959 | Fowler | 210/401 X |
| 620,786 | 3/1899 | Koerper et al. | 210/401 X |

Primary Examiner—Samih N. Zaharna
Assistant Examiner—Robert H. Spitzer
Attorney—Tom Arnold et al.

[57] ABSTRACT

A continuous belt-type gravity filtration system is provided which includes in the embodiments disclosed a series of cylindrical rollers around which a continuous belt in the form of a filter media is driven. The rollers provided include one wherein the filter belt is precoated, another which comprises a filter vessel and wherein filtration takes place depositing a filter cake on the filter belt, and another which comprises a heating drum to dry the filter cake. A system is provided for removing dry filter cake from the filter belt, and another system is provided to seal the filter belt as it contacts the filter vessel.

6 Claims, 3 Drawing Figures

CONTINUOUS BELT-TYPE GRAVITY FILTRATION APPARATUS

BACKGROUND OF THE INVENTION

In all industrial filtration processes, a pressure differential must be established across the filter medium. This is customarily done in one of two ways: application of pressure to the liquid being filtered, or application of a vacuum on the downstream side of the filter medium. A third alternative, which is relatively infrequently employed, is a simple gravity-filtration system using neither pressure on the fluid to be filtered, or vacuum. It is to this latter type of process that the apparatus of the present invention is directed.

The selection of a particular filtration process will depend upon the type of fluid to be filtered, whether the filter cake is valuable, the ratio of solid to liquid in the slurry, value of the process and cost of the filtration operation, pollution considerations, and other factors. It is quite apparent that many of the different types of industrial filtration processes available today find utility in certain situations, and are not desired in others.

The applicability of gravity filtration processes is limited, but such processes would be desirable and preferred for use in many instances in which they are not now used because of the absence at the present time of the availability of a system of this type which is continuous and effective to remove solids at an economical rate.

Most frequently used among the gravity filtration systems of the prior art, perhaps, have been the sand and gravel systems. These are useful in many contexts, but suffer from a number of distinct disadvantages. For example, the sand bed must be backwashed periodically to cleanse it of accumulated solids following filtration. The dirty backwash water is thus a problem especially now that industry is under considerable pressure (and in many cases operating under laws and regulations) to eliminate pollution of waterways and reservoirs. Also, the backwash process is expensive both in water used and filtration time lost. Besides the backwash problem, sand and gravel filters present the problem of getting rid of fouled filter aid, occupy a rather larger amount of space, and do not produce the quality of filtrate that may be desired in many instances.

Another type of gravity filtration process in common use is the clarifier, which is used for example in the processing of sugar cane juice. Here again, clarification is quite efficient in many operations but suffers from distinct disadvantages which make its use at the present time, for example in processing sugar cane juice, a matter of the least undesirable alternative. Among the problems which have been recognized by the industry in connection with use of clarifiers in such context are excessive floor space used, poor filtration efficiency and poor filtrate quality, and excess residence time of the hot juice in the filter thereby causing excess loss of sucrose by inversion.

It would be desirable if a gravity filtration process could be provided which would be efficient and economical, and which would give a high quality filtrate in a reasonable time period.

It would be desirable if a continuous gravity filtration process could be provided which would eliminate pollution problems presently being experienced by yielding a dry filter cake which could be utilized as land fill or easily incinerated.

It would further be desirable if a gravity filtration process could be provided which would eliminate or reduce the problems presently experienced in such processes, such as those mentioned above.

The present invention provides a gravity filtration apparatus having these and other advantages, as will be more completely explained herebelow.

SUMMARY OF THE INVENTION

A gravity filtration apparatus is provided which is economical and efficient, and which requires a minimum amount of supervision by labor. The apparatus includes providing a continuous filter belt, nd directing the belt first through a precoat area where the belt is impregnated with a precoating liquid to increase the filtration efficiency thereof. Then the belt is fed to the filtering area where the fluid to be filtered is brought into intimate contact therewith, a seal being established between the filter belt and the vessel which retains the fluid to be filtered. As the fluid to be filtered is contacted with the filter belt, over a relatively long period of time, a filter cake builds up on the filter belt, the filtrate being collected in a separate vessel. After the filter belt leaves the filtering area, it then is passed over a heated drum to dry the filter cake, and then the filter cake is removed from the belt. The clean belt is then recirculated in a continuous manner.

Apparatus is provided which includes a series of cylindrical rollers suitable for providing the precoating vessel, the filter vessel, and the heated drum. Also provided is a backing belt, of a continuous nature, to support the filter belt in the area of the filtration vessel, means for collecting the filtrate, sealing means to avoid by-passing of fluid to be filtered around the filter belt, and means for removing filter cake from the filter belt.

BRIEF DESCRIPTION OF THE DRAWINGS

In order that the invention may be more completely understood, reference will be made herein to the accompanying drawings which are exemplary of the best modes of the invention known to applicant at the time of this application, which form a part of this specification, and wherein.

DETAILED DESCRIPTION OF PREFERRED EMBODIMENTS

Figure 1:
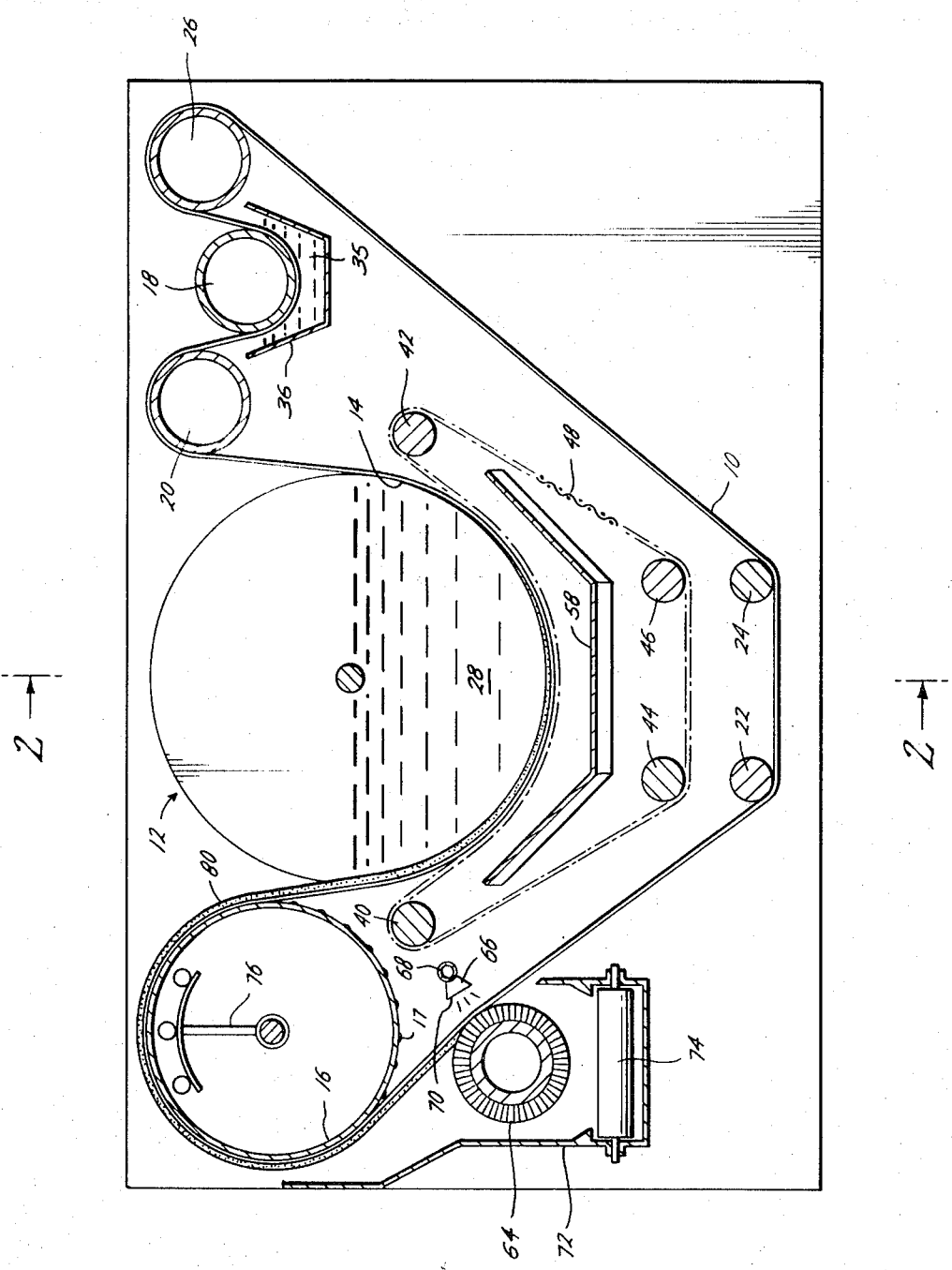
FIG. 1 is a pictorial view, in section, illustrating apparatus in accordance with one embodiment of the invention.
Figure 2:
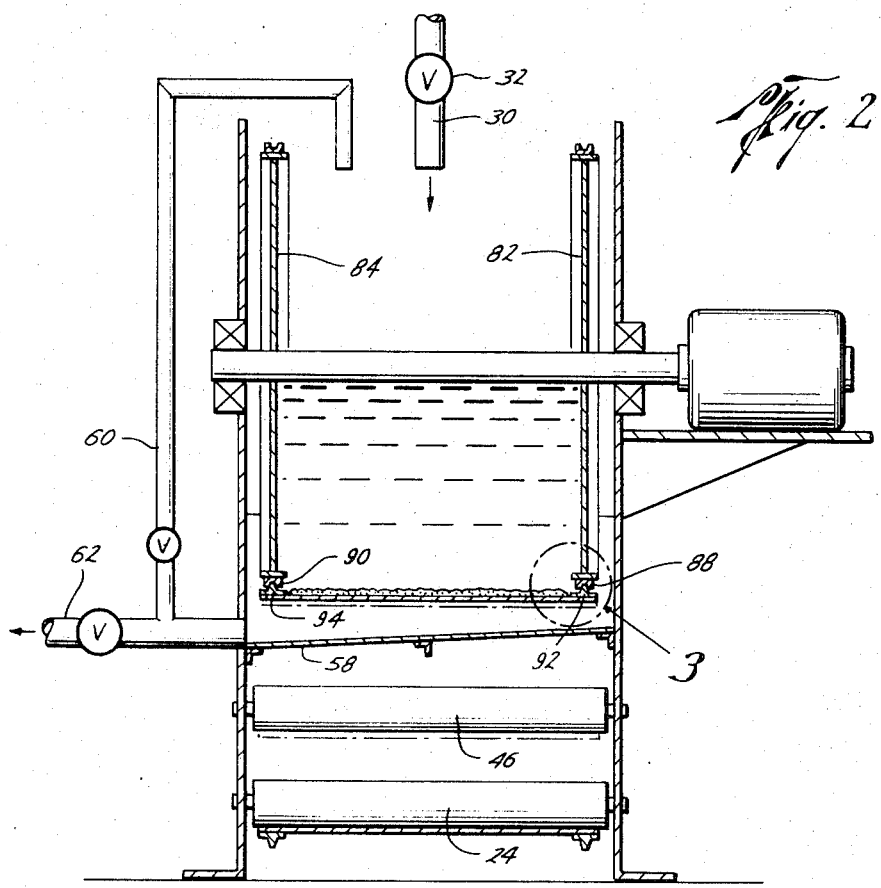
FIG. 2 is a view taken along the lines 2—2 of FIG. 1.
Figure 3:
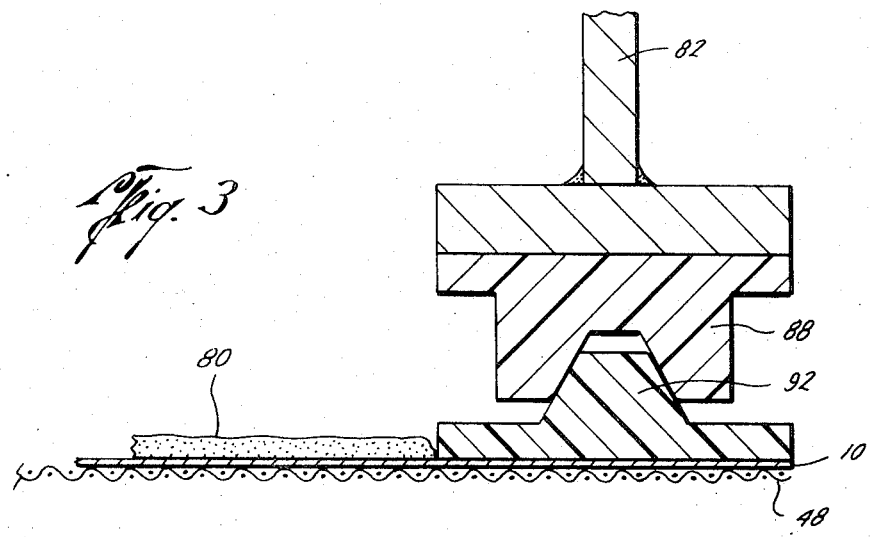
FIG. 3 is an enlarged view of a portion of the apparatus shown in FIG. 2.

Referring now in more detail to the preferred embodiments shown in FIGS. 1-3, there is seen in FIG. 1 a continuous belt 10 which is the filter media in accordance with the invention. The filter belt 10 may be constructed of any material suitable for filtering the type of fluid to be filtered, for example any of the commercially available filter cloth materials.

Also illustrated in FIG. 1 is filtration apparatus 12 through which the belt 10 moves continuously in a manner which allows for the deposit on the belt of a filter cake and the subsequent cleaning of the cake from the belt, and then recycling of the belt through the apparatus 12 to repeat the continuous process.

The apparatus 12 comprises a series of cylindrical drums or rollers at least one of which comprises a filter vessel, means for collecting the filtrate, and backing means for the belt 10.

According to this embodiment of the invention, the series of rollers provided includes the filter vessel 14, a heated drying drum 16, a precoat trough 18, a feed roller 20, and positioning rollers 22, 24, and 26.

The filter vessel 14 is desirably the largest of the rollers, thereby providing a large amount of contact area with the filter belt 10 as it moves across the lower potion of the vessel 14, in close contact therewith. Although other configurations of the filter vessel 14 might be advantageous or preferred in some contexts, the vessel 14 shown in FIGS. 1 and 2 includes two spaced-apart flat circular end members 82, 84, joined by a centrally disposed shaft 86. This particular vessel 14 has no cylindrical side wall, the filter belt 10 forming an arcuate wall over the lower half of the vessel, thereby allowing the vessel 14 to be filled with fluid to a maximum depth of half full. The vessel 14 is thus filled to any desired level, or example half full as illustrated in FIG. 1, with the fluid 28 to be filtered. The fluid 28 is brought into the vessel 14 from a source through a suitable conduit such as the pipe 30, which desirably contains suitable flow control means such as the valve 32.

Means for drying the filter cake after filtration are desirably provided in the form of a roller 16 which is desirably considerably smaller in diameter than the vessel 14, and which is positioned on the downstream side of the filter vessel. The roller 16 is heated so that as the filter belt 10 is passed therearound, the filter belt will be heated and the filter cake thereon dried. The temperature of the roller 16, and the size of the roller provided are to some extent determined by the moisture content desired in the final filter cake product.

The drum 16 desirably includes therein a plurality of dimples or slight protrusions 17, which serve to stretch the filter belt 10 as it passes therearound, thereby causing a breakup in the filter cake formed on the belt 10, making the filter cake easier to remove and making the removal process more efficient and more complete.

Heat may be supplied by any suitable means, for example by an electric heater 76, to the surface of the drum 16.

Precoating means are desirably provided in the form of a precoating vessel in the form of the roller 18 located upstream from the filter vessel 14. Retained in this vessel is a precoating liquid 35, which is suitable for precoating the filter belt 10 before it is brought into the filtering area in filter vessel 14. A trough 36 is included just below the precoat roller 18, so that as the precoating fluid falls through the roller 18 onto the filter belt, that portion of the fluid which is not retained or absorbed by the filter belt 10 as the belt passes beneath the roller, falls by gravity into the trough 36. The precoating fluid from the trough 36 is desirably recirculated through a line not shown back into the precoat vessel 18. Any suitable type of precoating fluid may be used, the precoating serving to greatly increase the efficiency of the filter cloth 10 in filtering the solids from the vessel 14, especially at the initial stages of that filtration.

Means for feeding the filter belt 10 into initial contact with the filter vessel 14 desirably take the form of the feed roll 20 which in this embodiment is slightly larger in size than the precoat vessel, and is located intermediate the precoat vessel and the filter vessel 14.

Other suitable means for positioning and driving the filter belt 10 in its continuous cycle are provided as desired, as illustrated in this embodiment by the positioning rollers 22, 24, and 26.

A backing support system for the filter belt 10 is provided which comprises in this embodiment, a couple of feed rollers, a couple of positioning rollers, and a backing support belt.

The feed rollers 40 and 42, one of which is located at the initial contact point of the belt 10 with the filter vessel 14 and one of which is located at the corresponding exit point, are desirably solid discs which may be driven at any convenient speed.

Suitable positioning rollers 44 and 46 are also provided, such rollers being identical, if desired, with the above-mentioned positioning rollers 22, 24, and 26.

Backing support means for the filter belt 10 which is especially desirable to keep the belt 10 from sagging in the middle under the heavy load of the liquid in the chamber 14 as the belt passes beneath the filter vessel 14, desirably takes the form of a continuous wire mesh belt 48 which is continuously driven around the rollers 40, 44, 46, 42. The speed of the belt 48 is desirably synchronized with the vessel 14, each being driven off the same shaft (not shown).

One feature of the present invention which provides for distinctly efficient operations, is the sealing means which is provided to seal the filter cloth 10 to end members 82 and 84 of the filter vessel 14. [It will be recognized that such a seal is desirable if there is to be efficient filtration of the liquid in the vessel 14, since in the absence of a seal between the filter vessel and the filter media, fluid to be filtered could short-circuit the media and thus escape unfiltered.] These sealing means conveniently take the form illustrated in detail in FIG. 3, comprising a female extrusion 88 and 90 on the end members 82 and 84 respectively, and male members 92 and 94 formed to mate therewith, and located at each end of the belt 10. Each of the extrusions are preferably constructed of a synthetic polymeric material such as polypropylene, and the fit between male and female members is so tight that leakage of fluid from the chamber 14 is prevented.

The extrusions may be affixed to the end members 82 and 84, and the belt 10, by any suitable means. For example, the extrusions 92 and 94 may be heat sealed to the belt 10, which may desirably be constructed of synthetic polymeric (e.g., polypropylene) monofilament cloth.

Means for collecting the filtrate from the filtered fluid as it passes through the filter belt 10 are provided beneath the filter vessel 14. Such means desirably comprise an effluent trough 58 which is desirably of U-shaped cross-section, the two arms thereof extending to points beneath the entrance and exit points of the filter belt 10 as it contacts the filter vessel 14. Means are provided for recirculating filtrate from the effluent trough 58 back into the filter vessel 14, when desired, such means taking the form of the conduit 60, and other means such as the conduit 62 are provided for withdrawing the clear filtrate.

Other apparatus may be provided as desired, and in this embodiment such apparatus includes means for removing the dried filter cake from the filter belt 10, and means for collecting and transporting the removed filter cake.

Means for removing the filter cake from the filter belt 10 desirably comprise, in accordance with this embodiment of the invention, a rotating brush 64 and an air blast device 66. The brush 64 is rotated so that the bristles thereof come into intimate contact with the filter cake on the filter belt 10 and scrub the cake from the filter medium. It is believed that the air blast emanating from the opposite side of the filter medium directly opposite the rotating brush is particularly effective to clean the filter cake from the filter belt, by blowing out the filter cake from the interstices of the filter cloth.

The air blast device 66 is connected to a suitable source of air under pressure [not shown] by suitable means such as the conduit 68, and is desirably constructed with a narrow slot or opening 70 therein through which the air under pressure may be directed at high velocity.

Means for transporting the removed filter cake may desirably take the form of a conveyor belt 74, which passes under the point at which the brush 64 contacts the belt 10, and through a housing 72 suitable for collecting and retaining any portions of the filter cake which do not fall onto the conveyor belt 74.

Suitable means such as suitable motors and pumps are provided for driving the various rollers and for pumping the various fluids through the conduits illustrated.

In accordance with a method of using the apparatus of the invention, a filter belt and apparatus of the type described above are provided, and the filter vessel 14 is filled to the desired level with the fluid to be filtered. Filter aid is added to the fluid in vessel 14, if desired. For example, if the filter cake produced is to be incinerated a cellulose fibre or wood flour may be added as a filter aid to promote incineration. A precoating fluid is fed into the precoat vessel 18, and heat is applied to the vessel 16 by actuating the electric heater 76.

The rollers are then driven so that a selected point on the belt 10 passes first to a precoating area beneath the precoat roller 18 and in contact therewith, whereupon the belt 10 is precoated with the liquid precoat composition to enable it to filter more efficiently. The belt then passes around feed roller 20 and backing belt 48, into the filtering area on the lower side of the filter vessel 14, a seal being formed between the belt 10 and the end members 82 and 84 of filter vessel 14.

As the filter belt 10 passes beneath the filter vessel 14, forming an integral part thereof, fluid from the vessel 14 is passed therethrough by gravity, resulting in the formation on the filter belt 10 of a filter cake 80. Fluid passes through the filter belt 10 and collects as filtrate in the effluent trough 58. Filter cake 80 continues to build up on the filter belt 10 until it exits from contact with the vessel 14 at the last contact point between the vessel 14 and the roller 40.

It will be recognized that the greatest pressure applied by the fluid in he vessel 14 will be at the lowest point, or the halfway point between initial and final contact between the filter belt 10 and the vessel 14. Filtration efficiency should be greatest at this point. It is believed, however, that good flow rate and great efficiency will be achieved from the point of initial contact adjacent feed roller 42, because of the use of the precoated filter belt 10, and that filtration will proceed, although perhaps to a reduced extent, even during the latter stages of contact between belt 10 and vessel 14, near the exit roller 40. A pressure drop is maintained across the entire area of contact between the vessel 14 and the filter belt 10.

The filter belt 10 is then passed to the drying area where it is in intimate contact around the heater roller 16. Heat from the drum 16 is effective to dry the filter cake 80. The belt then leaves the heated roller for the cake removal area, where the belt 10 is scrubbed by the brush 66. Filter cake 80 is removed by the brush 64 in conjunction with blasts of air from the blast device 66. This process is effective to substantially completely clean the filter cake both from the surface of the filter belt 10, and from the interstices thereof.

The filter cake 80 which is removed from the filter belt 10 is then collected on the conveyor belt 74 and is transported to any suitable location where it may be incinerated or utilized for land fill.

The belt 10 as it leaves the cake removal area is thus clean, containing no filter cake 80, and is thus free to effectively continue to recirculate to the precoat area to once more begin the continuous process.

The various rollers and the filter belt 10 may be constructed of any convenient size, depending upon a number of factors such as the type of slurry to be filtered and the degree of filtration desired, but applicant believes the relative sizes indicated in the drawings will be desired in many contexts of use.

As one specific embodiment, the filter vessel 14 may be 8 feet in diameter (i.e., the end members 82 and 84 are each 8 feet in diameter), the heated drum 16, 3 feet in diameter, the precoat roller 18, 1 foot in diameter, and the feed roller 20, 2 feet in diameter. The rollers 40 and 42 may be 1 foot in diameter, and the positioning rollers 22, 24, 26, 44, and 46, each 6 inches in diameter. At a fluid depth of 4 feet in a vessel 14 having a diameter of 8 feet, as illustrated in FIG. 1, the maximum pressure exerted by the fluid in the vessel will be approximately 1.8 pounds.

The speed of the filter belt may be adjusted and such adjustment will determine the buildup of filter cake on the filter belt 10 as it passes beneath the vessel 14. For best results in filtration of cane juice, belt travel of one inch per minute is suggested. Traveling at this rate and utilizing the roller sizes mentioned above, the filtering time for a given point on the belt 14 will be approximately two and one-half hours. Using the size drying drum suggested above, a drying time of about one hour is realized, and this is ample in such context of use. If further drying is necessary for a given process, a larger drying drum, or other drying drums, could be employed.

The effective area of filtration, and thus filtration capacity can be readily increased merely be widening the filter belt 10 as desired. It will be recognized, however, that the width of the belt 14 should correspond to the distance between the end members 82 and 84 (in this embodiment, the length of shaft 86). A belt of any convenient width (and shaft of convenient length),and rollers of any convenient depth, may be desirably employed.

It is seen from the above discussion that a filter apparatus is provided which requires the use of no pressure vessels, vacuum or power pumps because of its nature as a gravity system. A system is also provided which is not automated in the traditional sense, but which at the same time requires little attention because of its continuous nature and relatively trouble-free nature.

Further, a system is provided which is extremely economical, and which provides for no waste water. Since all water and filter cake are taken care of without need for discharge into waterways, etc., pollution problems are minimized. For many contexts of use, the system provided will yield a distinct economic advantage without many of the problems which have plagued the prior art.

Although the invention has been described in terms of particularly preferred embodiments, it will be apparent to those of skill in the art that various changes and modifications may be made in the methods and apparatus illustrated and described herein, without departing from the scope of the invention as defined in the following claims.

I claim:
1. Apparatus for use in filtering fluids by a gravity filtration process, comprising:
   a continuous filter belt forming a filtering media suitable for filtering said fluids;
   a cylindrical vessel consisting essentially of spaced end members, and an arcuate wall between said end members formed by a portion of said belt;
   said end members and said belt having mating sealing means circumferentially thereon, whereby said filter belt may be moved into intimate sealing contact with said end members to define a container for said fluids in said vessel, so that fluid may be held in said container and, upon establishment of a pressure differential across said belt, may be filtered through said belt resulting in the formation on said belt of a filter cake;
   a backing belt supporting the portion of said filter belt which is forming a part of said vessel;
   a precoating tank on the upstream side of said vessel so that said belt may be precoated to increase the filtration efficiency thereof;
   a cylindrical drum on the downstream side of said vessel, said drum being adapted for recipt of said filter belt in intimate contact therewith;
   means for heating said drum so that said filter belt may be dried upon contact with said drum; and,
   means downstream of said drum for removing filter cake from said filter belt, so that said belt is cleaned before it returns to said filter vessel for further filtration operations.

2. Apparatus in accordance with claim 1, wherein said arcuate wall forms an arc of substantially 180°.

3. Apparatus for use in filtering fluids by a gravity filtration process, comprising:
   a vessel containing fluids to be filtered consisting essentially of end members and an arcuate wall therebetween;
   a continuous belt comprising a filtering media suitable for filtering said fluids, a portion of said belt forming said wall;
   mating members on said end members and on said belt for positioning said belt in sealing contact with said vessel, so that fluid may be retained intermediate said end members and may be filtered through the portion of said belt forming part of said vessel, resulting in the formation on said belt of a filter cake;
   means for continuously removing a portion of said belt from said vessel, following deposit thereon of filter cake, and transferring said portion to a remote location for drying and removal of said filter cake;
   means for heating said belt to dry said filter cake;
   means for removing the dried filter cake from said belt and cleaning said portion of said belt; and,
   means for returning the cleaned portion of said belt to said vessel, whereupon additional fluid in said vessel may be filtered therethrough.

4. Apparatus in accordance with claim 3, wherein said apparatus additionally includes a precoating tank on the upstream side of said vessel having a precoating liquid therein, and means for bringing said belt into intimate contact with said precoatnng tank, so that said filter belt may be precoated to increase the filtration efficiency thereof.

5. Apparatus in accordance with claim 3, wherein said apparatus additionally includes a backing belt which supports said filter belt while said filter belt is forming a part of said filter vessel.

6. Apparatus in accordance with claim 3, wherein said arcuate wall forms an arc of substantially 180°.

* * * * *